United States Patent [19]

Treiber

[11] Patent Number: 4,561,921

[45] Date of Patent: Dec. 31, 1985

[54] LABEL APPLICATOR AND METHOD OF LABEL APPLICATION

[75] Inventor: Fritz F. Treiber, Centerville, Ohio

[73] Assignee: Hobart Corporation, Troy, Ohio

[21] Appl. No.: 491,630

[22] Filed: May 5, 1983

[51] Int. Cl.[4] .......................... B65C 9/08; B32B 31/00; B65H 3/08

[52] U.S. Cl. .......................... 156/297; 156/297; 156/299; 156/306.3; 156/384; 156/542; 156/556; 156/571; 156/584; 156/DIG. 33; 156/DIG. 42; 271/107; 271/99

[58] Field of Search .......................... 156/384, 541–542, 156/552, 556, 571, 584, DIG. 33, DIG. 42, 247, 249, 277, 285, 297, 299, 285, 306.3; 271/94–95, 99, 100, 102, 131–132; 414/125, 128; 271/107

[56] References Cited

U.S. PATENT DOCUMENTS

| | | | |
|---|---|---|---|
| 2,294,273 | 8/1942 | Buxbaum | 271/5 |
| 2,642,282 | 6/1953 | Backhouse | 271/236 |
| 3,208,375 | 1/1973 | Kistner | 156/572 |
| 3,264,161 | 8/1966 | Stremke, Jr. | 156/360 |
| 3,279,785 | 10/1966 | Linden | 271/194 |
| 3,321,105 | 5/1967 | Mavano | 156/584 |
| 3,372,079 | 3/1968 | Fellner et al. | 156/360 |
| 3,384,524 | 5/1968 | Hansen, Jr. | 156/360 |
| 3,616,094 | 10/1971 | Navin et al. | 156/571 |
| 3,989,574 | 11/1976 | Evans | 156/351 |
| 4,124,436 | 11/1978 | Pettis, Jr. et al. . | |
| 4,236,954 | 12/1980 | Edwards | 156/572 |
| 4,293,365 | 10/1981 | Geyser et al. . | |
| 4,343,462 | 8/1982 | Weisbach et al. | 271/267 |
| 4,367,118 | 1/1983 | Karp | 156/497 |
| 4,418,906 | 12/1983 | Scott | 271/99 |

FOREIGN PATENT DOCUMENTS

| | | |
|---|---|---|
| 1009099 | 5/1957 | Fed. Rep. of Germany . |
| 2031193 | 12/1971 | Fed. Rep. of Germany . |
| 1186024 | 4/1970 | United Kingdom . |

*Primary Examiner*—Edward C. Kimlin
*Assistant Examiner*—Mervell C. Cashion, Jr.
*Attorney, Agent, or Firm*—Biebel, French & Nauman

[57] ABSTRACT

A label applicator device receives a label from a label printer and applies the label to a package by means of a pressure-sensitive adhesive which coats one side of the label. The applicator device includes a label support means which receives a label with the adhesive coated side facing upward. The label support means includes a pair of fingers upon which the label rests. A label transfer nozzle is pivoted about a horizontal axis beneath the label support means into a first position in which it is received between the pair of fingers and engages the printed side of the label by means of a partial vacuum supplied through a vacuum port in the transfer nozzle. The transfer nozzle is then pivoted into a second position in which the adhesive coated side of the label is facing generally downward. The applicator device includes an applicator head which moves downward, removing the label from the transfer nozzle and pressing it into contact with the surface of a package.

12 Claims, 7 Drawing Figures

LABEL APPLICATOR AND METHOD OF LABEL APPLICATION

BACKGROUND OF THE INVENTION

The present invention relates to a device and method for applying a label to a package, and, more particularly, to such a device and method in which the label has printed indicia on one side and a pressure-sensitive adhesive coating on the other side.

The present invention is particularly suited for use with automatic weighing and labeling apparatus which determines the weight and total value of random weight packaged items and then labels the items accordingly. Such apparatus is commonly used in supermarkets to weigh and label produce and meat. In a system of this type, a package is conveyed to a weighing station where it is weighed. An electrical signal indicating the weight of the package is supplied to a control circuit which determines the total cost of the packaged item based upon the unit price which was previously entered into the control circuit by an operator. The control circuit then causes a label to be printed by a printer with various information, such as the weight, the price per unit weight, and the total price of the packaged item. Additionally, the label may bear a description of the packaged item, advertising, and Universal Product Code (UPC) information. The package is then delivered by the conveyor to a label applicator station where the printed label is affixed to the package.

In one type of commonly used weighing and labeling system, each label has the side opposite the printed side coated with a pressure-sensitive adhesive. Blank labels having a pressure-sensitive adhesive coating are typically provided on a strip of release material to which they are temporarily secured by the pressure-sensitive adhesive. Each label is printed while it is carried on the strip of release material. After the label is printed, it is peeled from the strip of release material, transported to an applicator device, and applied to a package.

It will be appreciated that after such a label is printed and stripped from the release material, the pressure-sensitive adhesive coating is exposed and renders the label somewhat difficult to transport and apply. In one prior art approach, shown in U.S. Pat. No. 3,985,603, issued Oct. 12, 1976, to Berner, the label is engaged by three belts which are arranged with two of the belts contacting the printed side of the label and the third belt contacting the adhesive coated side of the label. The third belt is continuously oiled by a wick which is held in contact with the belt and which tends to prevent adhesion between the belt and the label. A special toothed belt pulley is also provided for releasing the label from the belt. Such an arrangement requires that the supply of oil be checked from time to time to insure proper operation. Additionally, some amount of pressure-sensitive adhesive may tend to build up over a period of time on the belt and the toothed wheel.

Accordingly, it is seen that there is a need for an applicator device and method for receiving a printed label having one side coated with a pressure-sensitive adhesive, and applying the label to a package in a simply reliable manner without contacting the adhesive.

SUMMARY OF THE INVENTION

A label applicator device for receiving a label from a label printer and applying the label to a package, according to the present invention, may be used with a label having a printed side and an opposite side which is coated with a pressure-sensitive adhesive. The applicator device includes a label support means for receiving a label from the printer with the adhesive coated side facing upward, label transfer means, and an applicator head. The label support means includes a pair of fingers upon which a label rests when received by the support means. The label transfer means includes a transfer nozzle pivotable about a horizontal axis which is directly beneath the label support means. The transfer nozzle is pivotable between a first position, in which it is received between the pair of fingers to engage the printed side of the label by means of a partial vacuum supplied through a vacuum port in the transfer nozzle, and a second position, in which the adhesive coated side of the label is facing generally downward. The applicator head means removes the label from the transfer nozzle when the transfer nozzle is in its second position and moves downward to press the label into contact with the surface of a package.

The label support means may be tilted so as to allow the transfer nozzle to be pivoted between the fingers without contacting the edge of the label bridging the fingers. Toward this end, the ends of the fingers may point slightly upward. The label support means may further include a support plate from which the fingers extend such that a label received by the label support means rests on both the fingers and the support plate. The fingers point slightly upward with respect to the support plate.

The transfer nozzle may define a vacuum port which is elongated in a direction generally parallel to the horizontal axis about which the nozzle pivots.

The applicator head means may define a slot into which the transfer nozzle is received when the nozzle is pivoted into its second position. The applicator head may also define vacuum ports. The applicator device further includes means for applying a partial vacuum to the vacuum ports so as to hold a label delivered thereto by the label transfer means until the label is brought into contact with a package. The applicator head is movable vertically between an upper position in which the head receives a label from the transfer nozzle as the transfer nozzle is received into the slot, and a lower position in which the head applies a label to a package. The applicator head defines at least one vacuum port on the bottom of the head to which a partial vacuum is applied such that a label is engaged by means of the partial vacuum with the printed side of the label in contact with the head and the adhesive coated side of the label facing generally downward.

The label support means may be mounted adjacent the label printer such that the printer discharges printed labels onto the support means in a direction generally parallel to the fingers. The label support means may further include means defining a knife edge for contacting the adhesive coated side of each label as it is discharged by the printer to ensure proper label position on the label support means.

A method of applying a label to a package in which the label has an adhesive coated side bearing a layer of pressure-sensitive adhesive material and an opposite printed side, the label being applied after it is discharged from a printer with its adhesive coated side facing upward and with the label being applied to a package at a point generally below the printer with the adhesive coated side of the label facing downward and contacting the package, includes the steps of:

(a) receiving the label on a label support adjacent to the printer with the support including a pair of fingers extending generally parallel to the direction of discharge from the printer;

(b) pivoting a transfer nozzle about a substantially horizontal axis into a first position between the fingers and beneath the label;

(c) engaging the label by means of a partial vacuum applied to the printed side of the label through a vacuum port on the end of the transfer nozzle;

(d) pivoting the transfer nozzle about a substantially horizontal axis into a second position while continuing to engage the label on the end of the transfer nozzle, such that the adhesive coated side of the label faces generally downward;

(e) engaging the label with an applicator head and removing the label from the transfer nozzle; and (f) moving the applicator head and label downward such that the adhesive coated side of the label is pressed against a package and the label is affixed to the package.

The step of receiving the label on a label support may include the step of positioning the label on the label support such that the edge of the label bridging the fingers is not contacted by the end of the transfer nozzle as the nozzle is subsequently pivoted into its first position.

The step of engaging a label with an applicator head may include the step of engaging a label by means of a partial vacuum applied through at least one vacuum port in the applicator head.

Accordingly, it is an object of the present invention to provide a label applicator device and method of label application in which a label bearing a layer of pressure-sensitive adhesive may be received from a label printer and applied to a package without significant contact with the adhesive coated side of the label; to provide such a label applicator device and method in which the label is securely held as it is transported from the printer to an applicator head; and to provide such a label applicator device and method in which label application is accomplished in a simple, reliable manner.

Other objects and advantages of the invention will be apparent from the following description, the accompanying drawings and the appended claims.

DETAILED DESCRIPTION OF THE PREFERRED EMBODIMENTS

Figure 1:
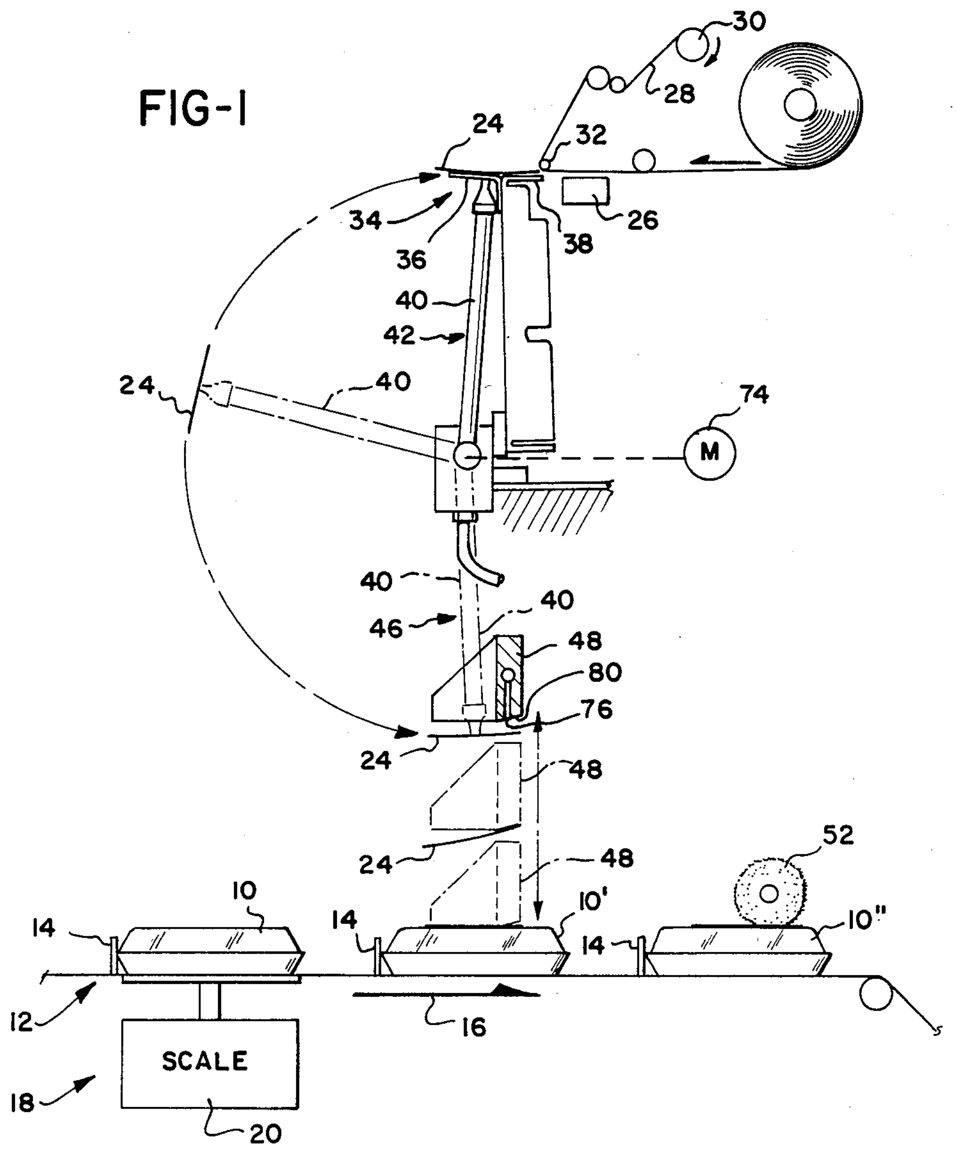
FIG. 1 is a front view of the label applicator device of the present invention, illustrating schematically the manner in which a label is applied to a package.

Reference is now made to FIG. 1 which illustrates, somewhat schematically, a system including the label applicator device of the present invention, which weighs packages, prints labels, and applies the labels to the packages. Such a system will typically be used in a grocery store to weigh packaged items, print labels which list the weights of the packaged items and other information, and apply the labels to the packages. Each label may include such information as the weight, price per unit weight, and total price of the corresponding packaged items, a description of the packaged item, advertising, and UPC bar code symbols which are readable at the checkout counter.

To initiate operation, packages 10, 10' and 10'' are loaded either manually or automatically onto a conveyor, illustrated diagrammatically at 12. The conveyor mechanism may include a plurality of bars 14 which are raised through slots in the conveyor support surface to slide the packages along the support surface. The support surface may comprise a plurality of rails which extend generally parallel to the direction of package movement, indicated at 16. Such a conveying mechanism is shown more fully in U.S. Pat. No. 3,732,966, issued May 15, 1973, to Treiber.

Each of the packages is supplied to a weighing station 18, where a scale 20 measures the weight of the package. The weight information is communicated to a control system which may include a microprocessor. The control system computes the total price of the package by multiplying the price per unit weight, previously set by an operator, by the measured weight of the package. This information is then printed on a label 24 by printer unit 26. Printer 26 may preferably be a thermal printer of the type having an array of individually energizable heater elements which are selectively activated. Such a printer operates by causing the heat sensitive label stock to change color at desired points so as to produce the desired indicia on the labels.

Blank labels, having one side coated with a pressure-sensitive adhesive, are carried on a strip of release material 28. The labels are transported past the printer unit 26 by a drive mechanism connected to take-up hub 30 upon which the release material is wound. After printing by printer 26, each label is stripped from the release material 28 by drawing the release material 28 under tension around a sharp bend, defined by pin 32.

The label 24 is discharged from the printer unit with its adhesive coated side facing upward and is received on a label support means 34 which includes a pair of fingers 36 (FIG. 2) and a support plate 38. The label 24 rests with the fingers 36 and the plate 38 in contact with the printed side of the label.

A label transfer means, including a transfer nozzle 40, is pivotable about a horizontal axis which is directly beneath the label support means, as shown in FIG. 1. The transfer nozzle is pivotable between a first position, indicated at 42 in which it is received between a pair of fingers 36 to engage the printed side of the label 24 by means of a partial vacuum supplied through vacuum port 44 in the transfer nozzle 40, and a second position, illustrated at 46 in which the adhesive coated side of the label 24 is facing generally downward. An applicator head 48 removes the label 24 from the transfer nozzle 40 when the transfer nozzle is in its second position. The applicator head 48 moves downward, as shown in FIG.

4, and presses the label 24 into contact with the surface 50 of package 10. As shown in FIG. 1, the package is then transported by the conveyor 12 beneath a roller 52 which presses the label firmly into contact with surface 50.

Figures 5, 6, 7:
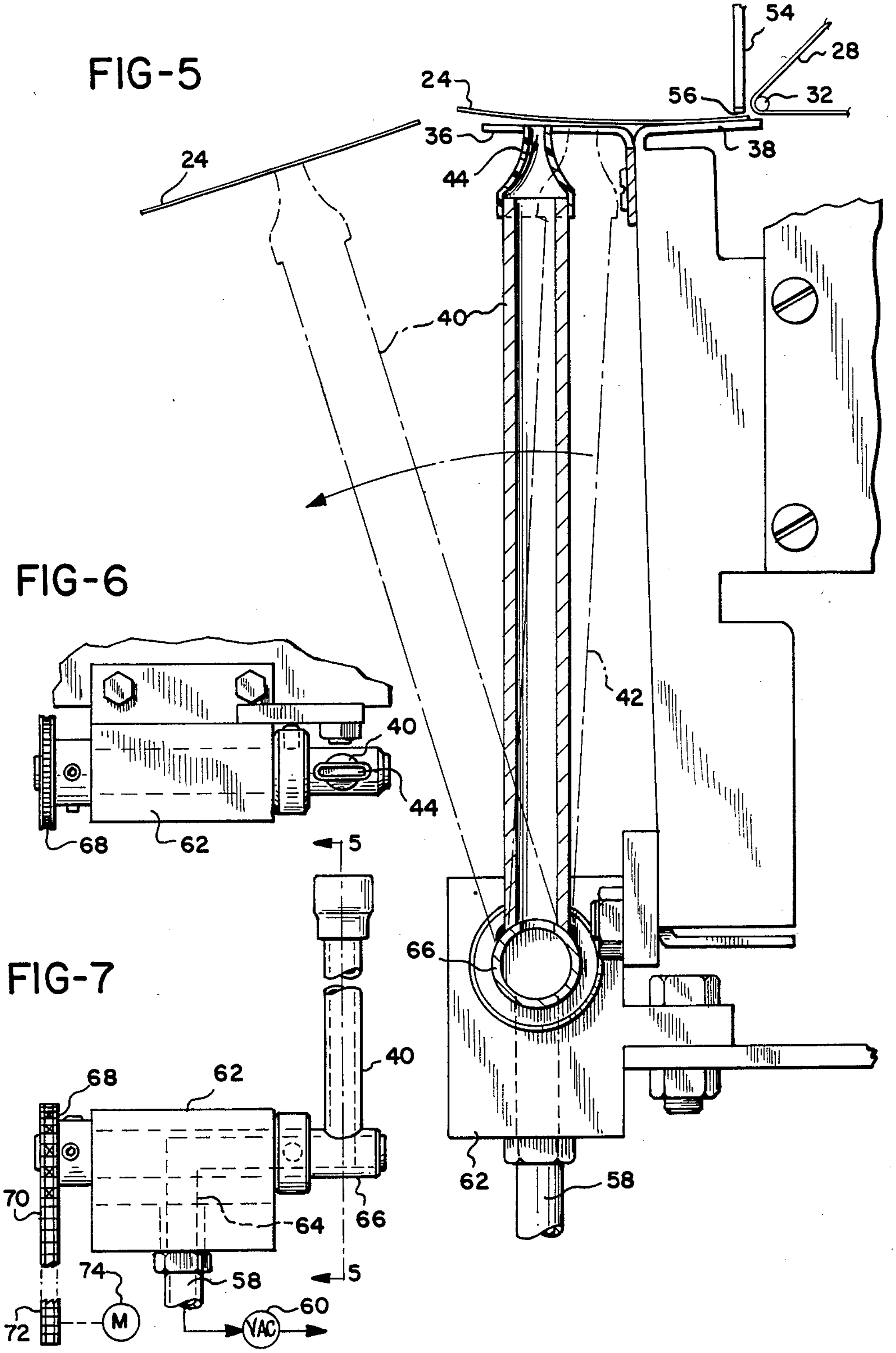
FIG. 5 is an enlarged sectional view taken generally along line 5—5 in FIG. 7, showing the transfer nozzle in greater detail.
FIG. 6 is a plan view of the transfer nozzle and the nozzle support structure with the label support means removed.
FIG. 7 is a side view of the transfer nozzle and support structure.

As seen most clearly in FIG. 5, it has been found preferable to position the fingers 34 such that they point slightly upward with respect to the support surface defined by plate 38. It will be appreciated that as a label 24 is stripped from the release material 28 as the material passes around pin 32, the label may tend to be curled slightly upward. The upward tilt of the fingers 34 tends to follow this curve. Additionally, the ends of fingers 34 are sufficiently raised with respect to the upper end of nozzle 40 such that as the transfer nozzle 40 is pivoted clockwise into position 42, the end of nozzle 40 does not contact the edge of the label 24 which bridges the fingers 36.

In order to ensure that each label is properly stripped from release material 28, a pin 54 is positioned adjacent pin 32. Pin 54 defines a knife edge 56 which runs parallel to the direction of movement of the label from the printer onto the support means 34. The knife edge, while contacting the adhesive coated side of the label 24, presents such a small surface area of contact that no significant adhesion between the edge and the label 24 results.

As seen in FIGS. 6 and 7, suction is supplied to the vacuum port 44 by means of a vacuum line 58 which is connected to a vacuum pump 60. The pivot support 62 defines a passageway 64 communicating with the hollow interior of shaft 66 which, in turn, communicates with the interior of the transfer nozzle 40. Shaft 60 extends through support 62 and is connected to sprocket 68. Chain 70 extends between a sprocket 72 and sprocket 68, and is driven by means of motor 74 connected to sprocket 72. Motor 74 is actuated at appropriate times to pivot transfer nozzle 40 between its first and second positions.

Figure 3:
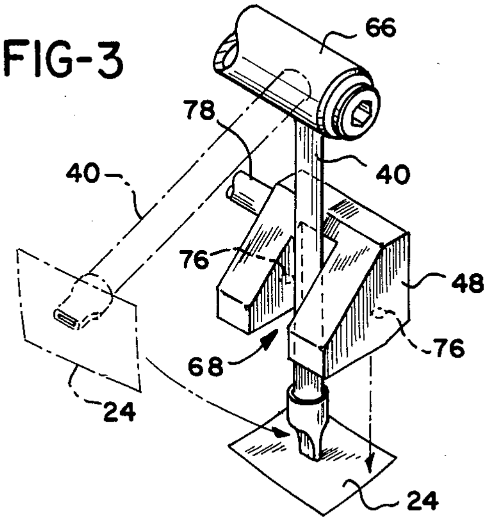
FIG. 3 is a perspective view showing pivoting of the transfer nozzle into a slot defined by the applicator head.
Figure 4:
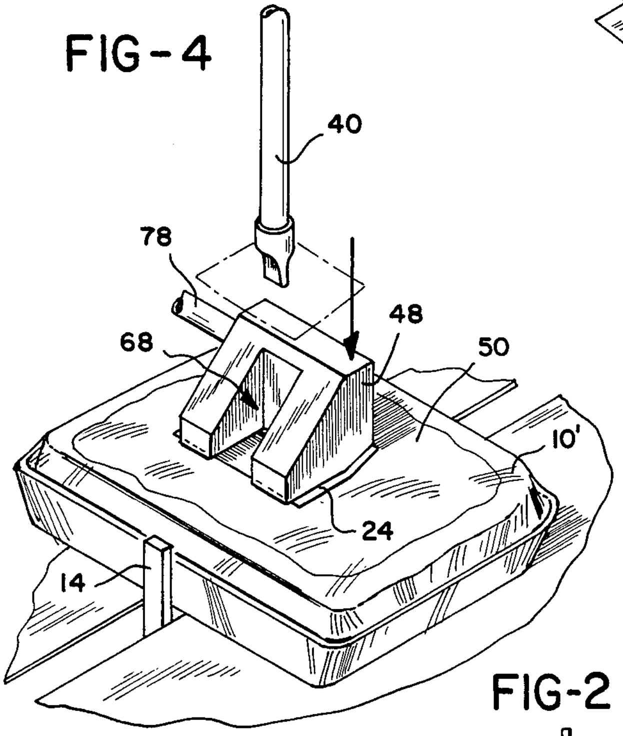
FIG. 4 is a perspective view illustrating application of a label to a package by the applicator head.
Figure 2:
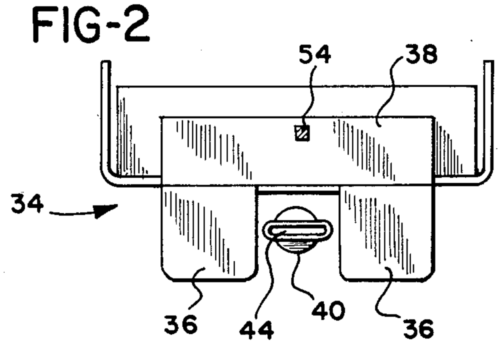
FIG. 2 is a plan view of the label support means, showing the transfer nozzle received between the fingers of the support means.

As may be seen most clearly in FIGS. 2–4, the vacuum port 44 is elongated in a direction generally parallel to the horizontal axis about which the transfer nozzle 40 is pivoted. By applying suction to the printed side of the label over an elongated area, it is much less likely that the label will rotate on the end of the nozzle 40 as the nozzle is pivoted from its first to its second position.

As seen in FIGS. 1, 3, and 4, the applicator head 48 defines a slot 68 into which the transfer nozzle 40 is received when the transfer nozzle is pivoted into its second position. When the nozzle 40 is in its second position as shown in FIG. 3, the label 24 is oriented with its printed side facing upward, and its adhesive coated side facing downward. The applicator head 48 is then moved downward, engaging the label 24 and at the same time pulling it off of the end of nozzle 40. Continued downward movement of head 48 results in label 24 being pressed against the top of package 10′. The applicator head 48 defines vacuum ports 76 on the bottom thereof. A partial vacuum is applied to the vacuum port 76 through the tube 78 which supports head 48, thus providing the mechanism by which a label is engaged. The partial vacuum may preferably be terminated as the label 24 is pressed against the top of a package such that there is no tendency for the label to be carried upward by the head 48. Tube 78, carrying head 48, may be raised and lowered by means of a cam and cam follower mechanism (not shown). Such a cam may be connected to the conveyor drive so as to lower the head 48 into contact with the surface of a package as the package is presented at the proper point by the conveyor.

As may be noted, the vacuum openings 48 are positioned on a slightly inclined portion 80 of the bottom of applicator head 48. As seen in FIG. 1, the second position 46 of the transfer nozzle 40 may be such that the label is not horizontal but rather inclined slightly upward to the right. This inclined bottom portion 80, therefore, provides for better engagement of the label 24 by the applicator head.

It will be apparent that only the printed side of a label is contacted by the label support means 34, the transfer nozzle 40, and the applicator head 48 during the application process. As a consequence, although the printed label has one side coated with a pressure-sensitive adhesive, the label is received from the printer, delivered to the package, and applied to the package in a reliable manner without the need for oil coated belt transports or other arrangements which engage and then release the adhesive coated side of the labels.

While the form of apparatus and the method by which this apparatus operates herein described constitute preferred embodiments of this invention, it is to be understood that the invention is not limited to these precise forms of apparatus and method, and that changes may be made therein without departing from the scope of the invention which is defined in the appended claims.

What is claimed is:

1. A label applicator device for receiving a label from a label printer and applying the label to a package, said label having a printed side and an opposite side which is coated with a pressure-sensitive adhesive, comprising:

label support means for receiving a label from a printer with the adhesive coated side facing upward, said label support means including a pair of fingers upon which a label rests when received by said support means, with said fingers in contact with the printed side of said label, label transfer means, including a transfer nozzle pivotable about a fixed horizontal axis which is directly beneath said label support means, said transfer nozzle being pivotable between a first position, in which it is received between said pair of fingers to engage the printed side of said label by means of a partial vacuum supplied through a vacuum port in the transfer nozzle, and a second position, in which the adhesive coated side of said label is facing generally downward, and applicator head means for removing a label from said transfer nozzle when said transfer nozzle is in said second position, said applicator head means defining a slot into which said transfer nozzle is pivoted into its second position and being movable vertically between an upper position in which said head receives a label from said transfer nozzle as said transfer nozzle is received into said slot, and a lower position in which said head applies a label to a package.

2. The label applicator device of claim 1 in which said label support means is tilted so as to allow said transfer nozzle to be pivoted between said fingers without contacting the edge of said label bridging said fingers.

3. The label applicator device of claim 2 in which the ends of said fingers point slightly upward so as to permit the end of said transfer nozzle to pass beneath the edge of the label bridging said fingers.

4. The label applicator device of claim 1 in which said transfer nozzle defines a vacuum port which is elongated in a direction generally parallel to said horizontal axis.

5. The label applicator device of claim 1 in which said label support means further includes a support plate from which said fingers extend such that a label received by said label support means rests on both said fingers and said support plate, said fingers pointing slightly upward with respect to said support plate.

6. The label applicator device of claim 1 in which said applicator head defines vacuum ports therein and in which said device further includes means for applying a partial vacuum to said vacuum ports so as to hold a label delivered thereto by said label transfer means until said label is brought into contact with a package.

7. The label applicator device of claim 1 in which said applicator head defines at least one vacuum port on the bottom of said head to which a partial vacuum is applied such that a label is engaged by means of said partial vacuum with the printed side of the label in contact with the head and the adhesive coated side of the label facing generally downward.

8. The label applicator of claim 1 in which said label support means is mounted adjacent the label printer such that the printer discharges printed labels onto said support means in a direction generally parallel to said fingers, and in which said label support means further includes means defining a knife edge for contacting the adhesive coated side of each label as it is discharged by the printer to ensure proper label position on said label support means.

9. A method of applying a label, having an adhesive coated side bearing a layer of pressure-sensitive adhesive material and an opposite printed side, to a package, said label being discharged from a printer with its adhesive coated side facing upward and being applied to a package at a point generally below the printer with its adhesive coated side facing downward and contacting the package, comprising the steps of:

(a) receiving the label on a label support adjacent to the printer, said support including a pair of fingers extending generally parallel to the direction of discharge from the printer, (b) pivoting a transfer nozzle about a fixed substantially horizontal axis into a first position between said fingers and beneath the label, (c) engaging the label by means of a partial vacuum applied to the printed side of the label through a vacuum port on the end of said transfer nozzle, (d) pivoting said transfer nozzle about a fixed substantially horizontal axis into a second position into a slot of an applicator head while continuing to engage the label on the end of the transfer nozzle, such that the adhesive coated side of the label faces generally downward, (e) engaging the label with the applicator head and removing the label from said transfer nozzle, and (f) moving the applicator head and label downward such that the adhesive coated side of the label is pressed against a package and the label is affixed to the package.

10. The method of claim 9 in which the step of receiving the label on a label support includes the step of positioning the label on the label support such that the edge of the label bridging the fingers is not contacted by the end of the transfer nozzle as the nozzle is subsequently pivoted into its first position.

11. The method of claim 9 in which the step of engaging a label with an applicator head includes the step of engaging a label by means of a partial vacuum applied through at least one vacuum port in the applicator head.

12. The method of claim 9 in which the step of engaging the label by means of a partial vacuum applied to the printed side of the label includes the step of applying the partial vacuum to an elongated area of the printed side of the label through an elongated vacuum port so as to engage the label securely and restrict the label from rotating on the end of the transfer nozzle as the transfer nozzle is pivoted.

* * * * *

UNITED STATES PATENT AND TRADEMARK OFFICE
CERTIFICATE OF CORRECTION

PATENT NO. : 4,561,921
DATED : December 31, 1985
INVENTOR(S) : Fritz F. Treiber

It is certified that error appears in the above—identified patent and that said Letters Patent is hereby corrected as shown below:

Col. 6, line 54, after "nozzle" the following was omitted --is received when said transfer nozzle--.

Signed and Sealed this

*Fifteenth* Day of *April 1986*

[SEAL]

*Attest:*

DONALD J. QUIGG

*Attesting Officer* *Commissioner of Patents and Trademarks*